United States Patent [19]
Chang

[11] Patent Number: 5,974,632
[45] Date of Patent: Nov. 2, 1999

[54] EYEGLASSES FASTENING DEVICE

[76] Inventor: Teng-Yen Chang, No. 9, Chung-Cheng Rd., Chang-Hwa, Taiwan

[21] Appl. No.: 09/166,565

[22] Filed: Oct. 6, 1998

[51] Int. Cl.$^6$ .................................................. A44B 21/00
[52] U.S. Cl. .............................................. 24/3.3; 24/298
[58] Field of Search ............................ 24/3.3, 3.4, 3.9, 24/3.11, 3.12, 3.13, 298, 300, 301, 302; 351/155, 157; 224/250, 269

[56] References Cited

U.S. PATENT DOCUMENTS

| | | | |
|---|---|---|---|
| 5,015,085 | 5/1991 | May | 351/157 X |
| 5,414,907 | 5/1995 | Kiapos | 24/303 |
| 5,654,787 | 8/1997 | Barison | 351/157 X |

Primary Examiner—James H. Brittain
Attorney, Agent, or Firm—Browdy and Neimark

[57] ABSTRACT

An improved eyeglasses fastening device has a fastening belt, a pair of decoration attachments, a pair of connecting pieces and two elastic rubber rings. Each decoration attachment having one side provided with an artistic printing has a two-staged engagement through hole in the diametric direction which is a round hole in communication with an oval hole. Each connecting piece has a central extension finger provided with a pointed piercing end. The decoration attachments are movably guided through the ends of the fastening belt respectively and the rubber rings are also secured to the terminals of the fastening belt by way of the connecting pieces respectively so that the decoration attachments can be adjustably engaged with the rubber rings when the rubber rings are attached to the temples of an eye glasses. Such a structure enables the terminals of the fastening belt covered with the connecting pieces to be concealed in use.

2 Claims, 4 Drawing Sheets

EYEGLASSES FASTENING DEVICE

BACKGROUND OF THE INVENTION

The present invention relates to an improved eyeglasses fastening device including a fastening belt, a pair of decoration attachments, a pair of connecting pieces and two elastic rubber rings. Each decoration attachment having one side provided with an artistic printing has a two-staged engagement through hole in the diametric direction which is a round hole in communication with an oval hole. Each connecting piece has a central extension finger provided with a pointed piercing end. The decoration attachments are movably guided through the ends of the fastening belt respectively and the rubber rings are also secured to the terminals of the fastening belt by way of the connecting pieces respectively so that the decoration attachments can be adjustably engaged with the rubber rings when the rubber rings are attached to the temples of a pair of eyeglasses. Such a structure enables the terminals of the fastening belt covered with the connecting pieces to be concealed in use.

The fastening belt of the present invention permits a pair of eyeglasses to be firmly engaged with the fastening device of its temples so that the fastening device will not be easily disengaged from the temples of a pair of eyeglasses due to violent external force in use in one aspect and the temples of a pair of eyeglasses will not be abraded by the fastening device of the present invention in another aspect.

Referring to FIGS. 1, 2, the conventional eyeglasses fastening device is comprised of a fastening belt 10, two rubber rings 20, two metallic retainers 30 and two decoration articles 40. Each decoration article 40 has a round decoration disc 41 which is provided with a pair of parallel locking plates 42 on one side thereof. The terminal ends of the fastening belt 10 are led through the rubber rings 20 and are bent backwards first. Thereafter, the reversely led terminal ends of the fastening belt 10 are in locking engagement with the locking plates 42 which are punched to firmly encompass the terminal ends. Afterwards, the retainers 30 are engaged with the rubber rings 20 respectively, rendering the rubber rings 20 in a digit 8 shape to complete the assembly.

Referring to FIGS. 3, 3A, in practical use, the 8-shaped rubber rings 20 are engaged with the ends of the temples of a pair of eyeglasses 50 first, and then the 8-shaped rubber rings 20 are pushed outwardly to lock the fastening belt in place with respect to the temples of the eyeglasses 50.

Such a prior art eyeglasses fastening device has the following disadvantages in practical use:
1. The temples of a pair of eyeglasses can readily push the retainer moving in such a manner that the 8-shaped rubber rings 20 will widely expand to make the fastening belt 10 separated from the temples.
2. The metallic retainers 30 are in constant contact with the temples 50 of a pair of eyeglasses, causing abrasive damage to the temples thereof easily.
3. The metallic retainers 30 can not be fixedly engaged with the rubber rings, so they are easily lost in use.
4. The decoration disks 41 of the decoration articles 40 are not exposed externally for sure every time in use, making their function less effective.
5. The ends of the fastening belt 10 are fixedly engaged with the decoration articles 40 only by two punched locking plates 42, causing them to be easily disengaged in use.
6. The decoration articles 40 are commonly made of metal, making a wearer feel uncomfortable when in direct contact in one aspect and they are easily oxidized by sweat in long use.

SUMMARY OF THE INVENTION

Therefore, the primary object of the present invention is to provide an improved eyeglasses fastening device having decoration attachments each having a two-staged engagement through hole in which the fastening belt and the connecting pieces can be housed with the rubber rings received therein so as to enable the rubber rings to be tightly engaged with temples of a pair of eyeglasses, effectively preventing the temples of a pair of eyeglasses from easy detachment from the rubber rings.

Another object of the present invention is to provide an improved eyeglasses fastening device having two decoration attachments that can be placed in such a position that the decoration printing thereon can be displayed with certainty making the outer appearance of the fastening device is more appealing to the eyes. This is due to the adoption of the decoration attachments having a two-staged through holes which can house the rubber rings engaged with temples of a pair of eyeglasses and the connecting pieces fixed to the fastening belt of the fastening device.

One further object of the present invention is to provide an improved eyeglasses fastening device which can firmly engage with the temples of a pair of eyeglasses in use therefore and can prevent the temples thereof from abrasion by the fastening device.

One still further object of the present invention is to provide an improved eyeglasses fastening device which is equipped with decoration attachments that are integrally made by plastics injection molding so as to lower the production cost thereof in one aspect and to prevent the decoration attachments from being oxidized by sweat in use in another aspect.

BRIEF DESCRIPTION OF THE DRAWINGS

FIG. 3A is an enlarged diagram showing the fastening detail of FIG. 3;

FIG. 4A is a sectional diagram showing the structure of a decoration attachment thereof;

FIG. 5A is a sectional diagram showing the joint of the connecting pieces to the fastening belt;

DETAILED DESCRIPTION OF THE PREFERRED EMBODIMENT

Figure 1:
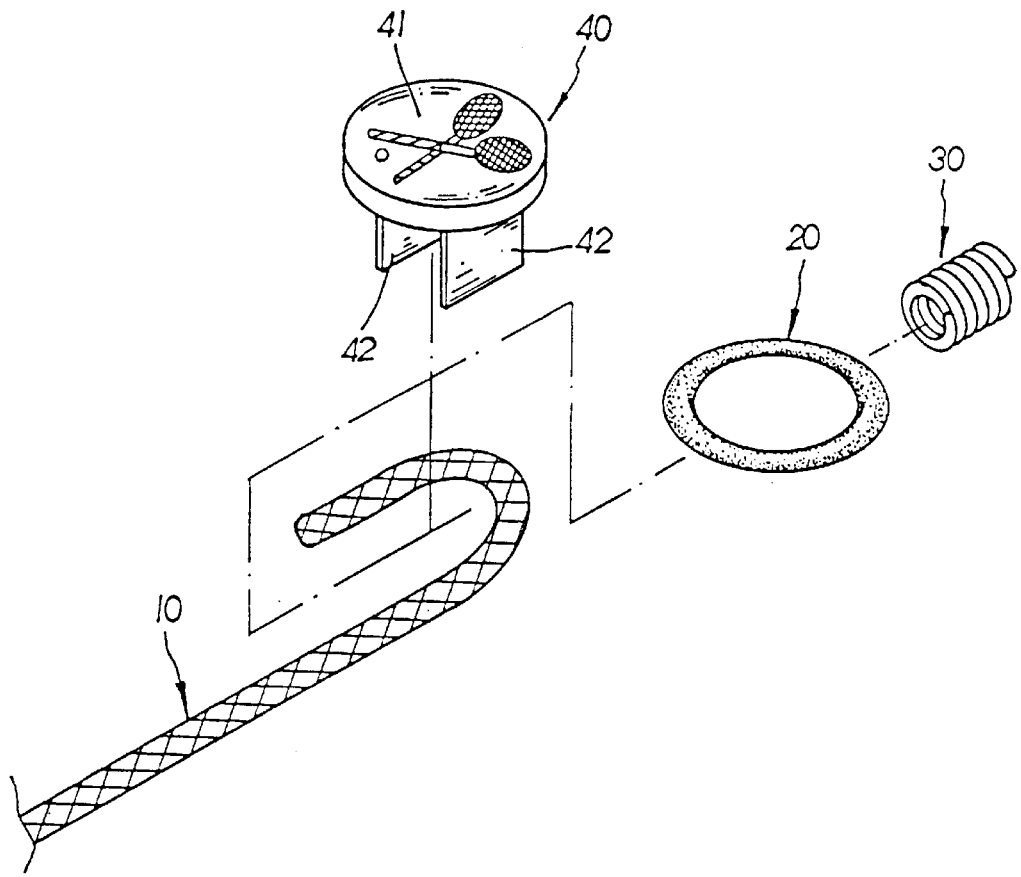
FIG. 1 is a perspective diagram showing the exploded components of a conventional eyeglasses fastening device.
Figure 2:
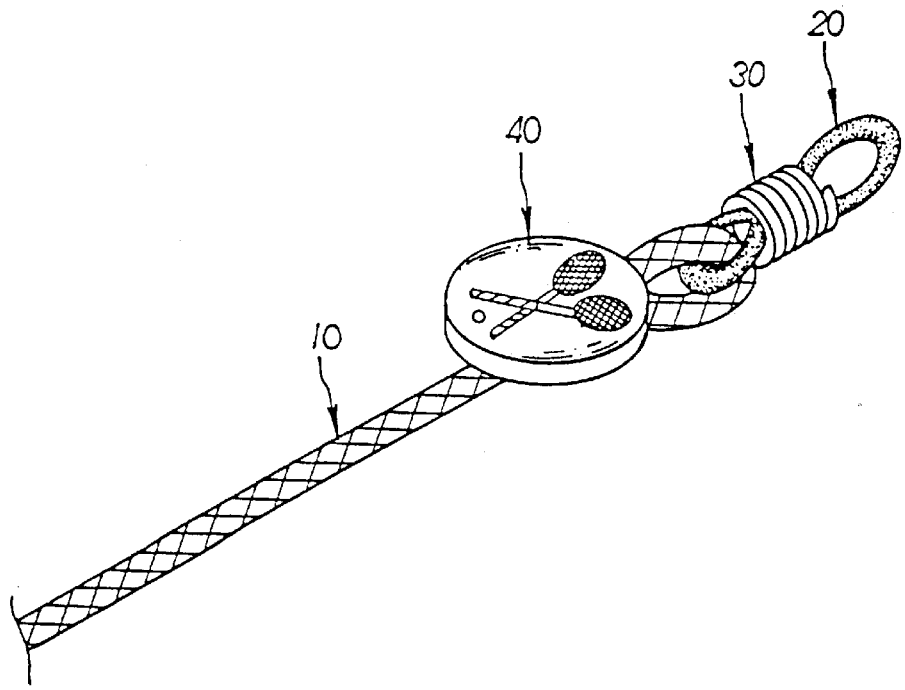
FIG. 2 is a diagram showing the assembly of the conventional eyeglasses fastening device.
Figure 3:
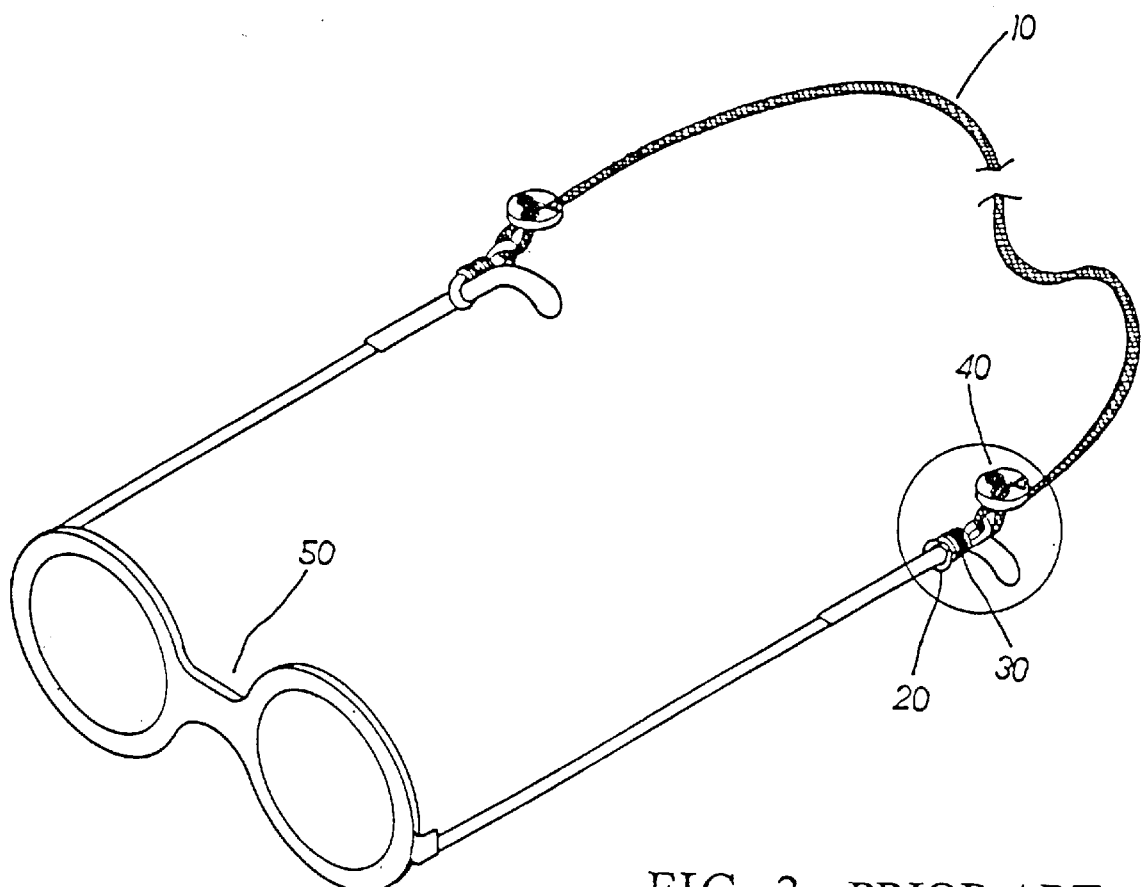
FIG. 3 is a diagram showing the application of the prior art eyeglasses fastening device to a pair of common eyeglasses.
Figure 3:
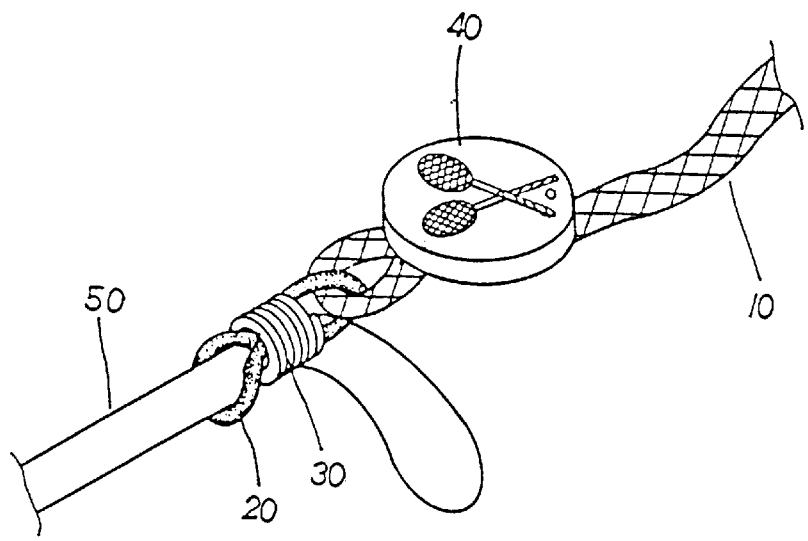
Figure 4:
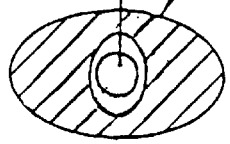
FIG. 4 is a perspective diagram showing the exploded components of the present invention.
Figure 4:
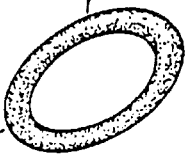
Figure 4:
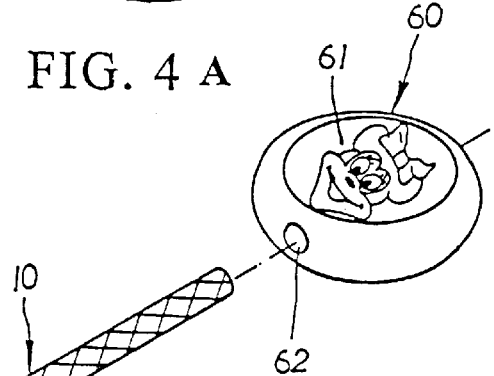

Referring to FIG. 4, the improved eyeglasses fastening device of the present invention is comprised of a fastening belt 10, a pair of decoration attachments 60, a pair of connecting pieces 70 and two elastic rubber rings 80. Each decoration attachment 60 of a round block of proper thickness has a decorative printing 61 defined on one side thereof. A two-staged engagement hole 62 is defined on the diametrical direction thereof, including a round hole in communication with an oval hole, as shown in FIG. 7.

Figure 5:
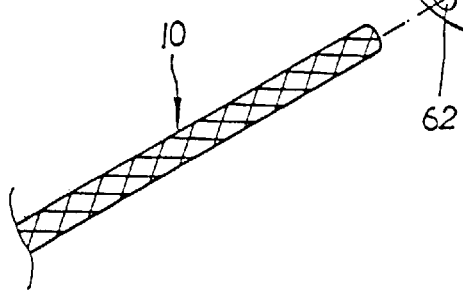
FIG. 5 is a diagram showing the application of the present invention to a pair of eyeglasses.
Figure 5:
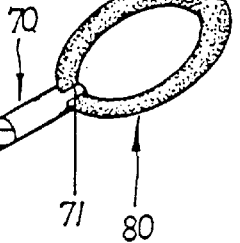

Each connecting piece 70 has a central extension finger 71 with a pointed piercing end and two side projections 70'. The two terminal ends of the fastening belt 10 are first led through the two-staged through hole 62 of the decoration attachments 60, as shown in FIGS. 5, 5A. Then, the two connecting pieces 70 are attached to the terminal ends of the fastening belt 10 respectively and fixed in place by way of the extension finger 71 having a piercing end. Next, the two side projections 70' of connecting pieces 70 are punched to wrap around the ends of the fastening belt 10 with the extension finger 71 concealed therein, as shown in FIG. 5A, to complete the assembly thereof The elastic rubber rings 80 fixed by the connecting pieces 70 can not pass through the round hole of the two-staged engagement through hole 62 of the decoration attachments 60 so that the decoration attachments 60 are not separable from the fastening belt 10, preventing the decoration attachments from being lost or swallowed by children.

Figure 7:
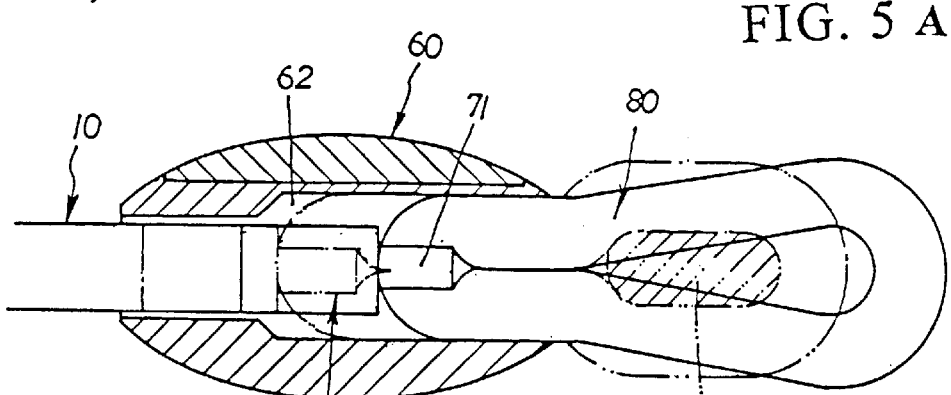
FIG. 7 is a sectional diagram showing the elastic rubber ring secured to the temple of an eye glasses.
Figure 6A:
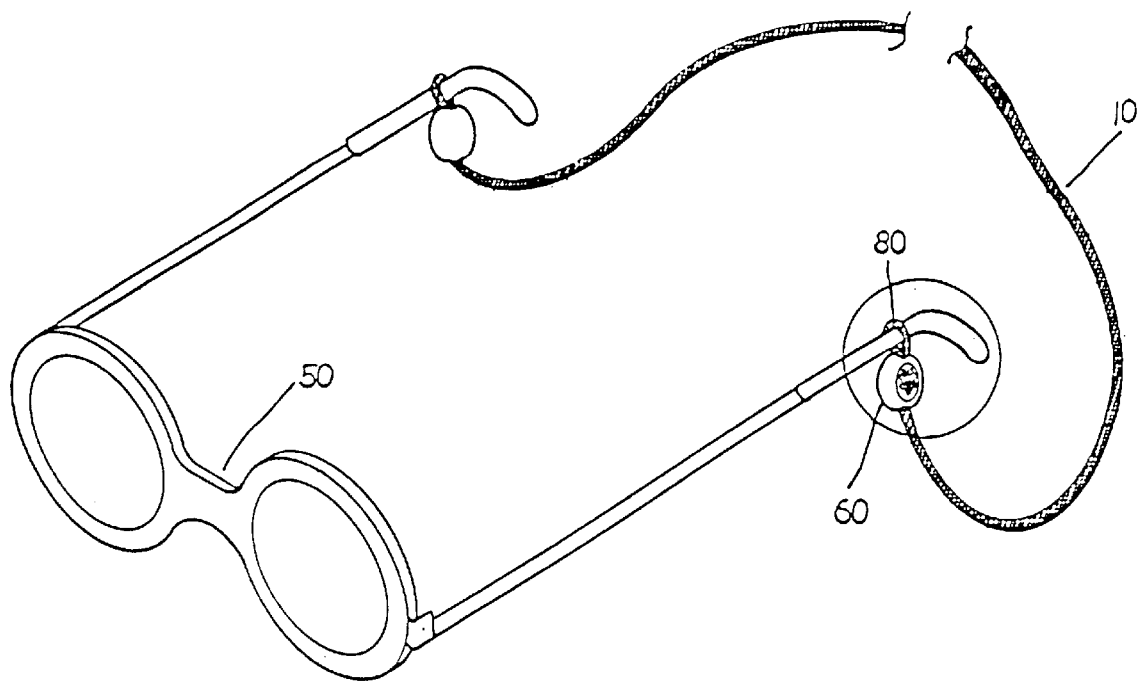
FIG. 6A is an enlarged diagram showing the engagement of the eyeglasses fastening device to the temple of a common eyeglasses.
Figure 6:
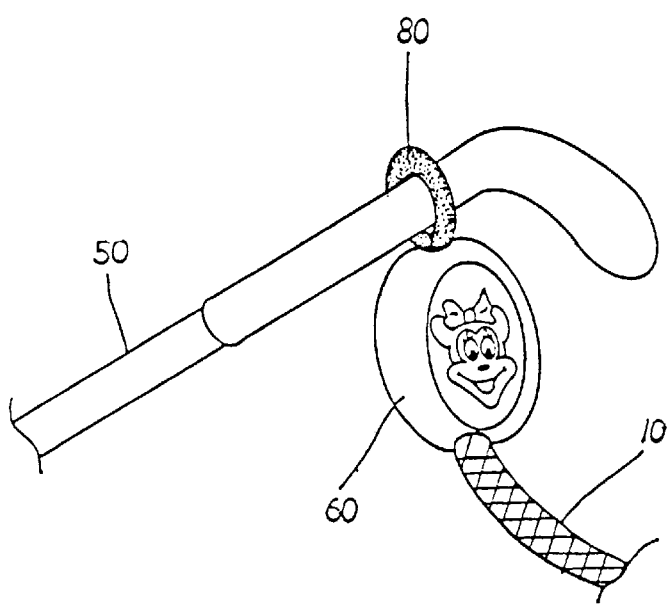
FIG. 6 is a diagram showing the application of the eyeglasses fastening device of the present invention to a common eyeglasses.

Referring to FIGS. 6, 6A, in practical use, the rubber rings 80 are engaged first with the ends of the temples 50 of a pair of eyeglasses and then the decoration attachments 60 are pushed toward the temples 50, as shown in FIG. 7, so as to pull part of the rubber rings 80 into the oval hole of the two-staged engagement through hole 62, causing the rubber rings 80 to tightly retain the temples 50 in place. Thus, the fastening belt 10 can be firmly associated with the temples 50 of a pair of eyeglasses.

It can be apparently seen that the present invention has the following advantages in practical use:
1. The connecting pieces 70 secured to the fastening belt 10 and the rubber rings 80 can pass through the small round hole and the oval hole of the two-staged engagement through hole 62 of the decoration attachments 60 respectively so as to enable the rubber rings 80 to firmly retain the temples 50 of a pair of eyeglasses.
2. The rubber rings 80 are retained in the oval hole of the two-staged engagement through hole 62 of the decoration attachment 60 so that the decorative printing 61 can be kept externally exposed.
3. The use of the decoration attachments 60 and the connecting pieces 70 make the fastening device of the present invention appealing to eyes.
4. Only the rubber rings 80 come into direct contact with the temples 50 of a pair of eyeglasses so as to prevent the temples 50 from being damaged by abrasion.
5. The connecting pieces 70 is firmly engaged with the ends of the fastening belt 10.
6. The decoration attachments 60 integrally produced by plastic injection molding are cheap in cost and are free of rust by sweat in use.

I claim:

1. An eyeglasses fastening device comprising:

an eyeglasses fastening belt, a pair of decoration attachments, a pair of connecting pieces and a pair of elastic rubber rings wherein:

each of said decoration attachments having a diametrically extended two-staged engagement through hole including a round hole and an oval hole in communication with each other;

each of said connecting pieces having a central extension finger provided with a pointed piercing end and side projections;

each end of said fastening belt being extended through said two-staged engagement through hole of each of said decoration attachments;

each said central extension finger being respectively extended through each said rubber ring, and bent toward and engaged to said terminal end of said fastening belt by said pointed piercing end;

each of said connecting pieces being further engaged to a terminal end of said fastening belt by engagement of said side projections to said terminal end over said central extension finger;

wherein, each said rubber ring is adapted to engage a temple of a pair of eyeglasses and be tightened thereon when part of said rubber ring is pulled into and engaged in said oval hole of said two-staged engagement through hole.

2. The eyeglasses fastening device of claim 1, wherein each of the decoration attachments is round and has a decorative printing on one side which can be externally exposed.

* * * * *